United States Patent [19]

Garvey

[11] 4,174,104

[45] Nov. 13, 1979

[54] CONVEYOR FOR CARDS AND SIMILAR ARTICLES

[75] Inventor: Mark C. Garvey, Antioch, Ill.

[73] Assignee: Garvey Corporation, Blue Anchor, N.J.

[21] Appl. No.: 819,465

[22] Filed: Jul. 27, 1977

[51] Int. Cl.² ............................................. B65H 5/06
[52] U.S. Cl. ..................................... 271/272; 271/240
[58] Field of Search ............... 271/264, 8 A, 238, 240, 271/272–274, 80; 226/184, 188, 189; 198/624

[56] References Cited

U.S. PATENT DOCUMENTS

| | | | |
|---|---|---|---|
| 1,659,848 | 2/1928 | Wilson | 226/184 X |
| 2,856,741 | 10/1958 | Hartman | 198/624 X |
| 3,078,024 | 2/1963 | Sardeson | 226/189 X |
| 3,360,260 | 12/1967 | Rapparlie | 271/264 X |
| 3,489,869 | 1/1970 | Greenwood | 271/274 X |

FOREIGN PATENT DOCUMENTS

790317 2/1958 United Kingdom ..................... 198/624

*Primary Examiner*—Richard A. Schacher
*Attorney, Agent, or Firm*—O'Brien and Marks

[57] ABSTRACT

A conveyor for moving successively a plurality of articles, typically cards, in flat horizontal position, longitudinally along a horizontal bed, comprises a plurality of chamfered rollers rotating at uniform speed on vertical axes, disposed in two laterally spaced lines extending along the bed, with the rollers of each line rotating in a direction opposite to that of the rollers of the other line, all the rollers making propelling contact with the edge margins of the cards, and all mounted in modules adapted to be spliced endwise to each other, and all geared together in groups individually driven directly by a single power source.

8 Claims, 15 Drawing Figures

CONVEYOR FOR CARDS AND SIMILAR ARTICLES

DESCRIPTION

BACKGROUND OF THE INVENTION

In a number of industries, the manufacturing, packing, and processing of various products requires conveying articles of relatively small size and area, and of thin, flat shape, typically cards of plastic or fibrous material, and other objects having portions of such size and shape, in carefully maintained flat, horizontal position, longitudinally along the bed of a conveyor. The conveying may be for the purpose of movement from one station to another in a manufacturing process, or through a station where a step in the process is being performed. In many cases it is desirable or essential that the articles being conveyed be maintained accurately horizontal and at constant speed of movement, as for example in certain medical and laboratory operations where liquids, powders or tablets are dropped into open pockets in cards which are thereafter to be covered and sealed. In other industries, cards or equivalent media bearing printed circuits, particularly miniaturized ones, require careful handling to avoid scratching or other marring by surface contact with conveyor machine elements.

The present invention aims to provide a conveyor, preferably embodied in a module adapted to be connected endwise to other similar modules, all of which may be individually powered, to constitute an installation of any desired length that will move articles of the kind indicated at constant speed in a carefully maintained flat horizontal position, by rollers making propelling engagement in minimal contact with no more than the side edges of the articles.

SUMMARY OF THE INVENTION

The foregoing and other related objects of the invention are attained by providing on the bed of the conveyor a pair of laterally spaced lines of propelling rollers mounted to rotate on vertical axes, all connected in coupled relation so that all are rotated at the same peripheral speed, and so that the rollers of the two lines turn in opposite directions. The rollers are suitably chamfered, or grooved, so as to make light gripping contact with the articles to be conveyed by minimal edge or marginal engagement only, sufficient to propel the articles successively along the bed in well maintained longitudinally spaced relation. The coupled relation is preferably provided by inter-engaged driving and idler gears appropriately trained between the power source and the propelling rollers, or by endless belts similarly disposed, or within the broad principles of the invention by other mechanically equivalent means. Preferably each module is individually powered by its own motor, and contiguous modules in an installation are spliced to each other and geared or trained together for uniform drive and operation of all the modules as a unit.

Again preferably, the rollers in each of the two laterally spaced lines are divided into groups which are not geared to each other or otherwise directly interconnected, each group being driven by its own drive gear, which itself is directly connected to the motor power source. Thus the rollers of each group, constituting an aliquot portion of the totality of rollers, are geared together, with no direct inter-group connection but with direct connection only to the motor reduction gear output, whereby undue strain on components of a long gear train are obviated. That is to say, the plural groups aligned in the module are powered by a single motor to which the groups are connected in parallelism rather than in series, thus sharply limiting the drive requirements of the individual gears.

SHORT DESCRIPTION OF THE DRAWINGS

In the accompanying drawings, which illustrate certain embodiments of the invention which have been reduced to practice and found to give satisfactory results, and hence are at present preferred.

DESCRIPTION OF THE PREFERRED EMBODIMENTS

Figure 1:
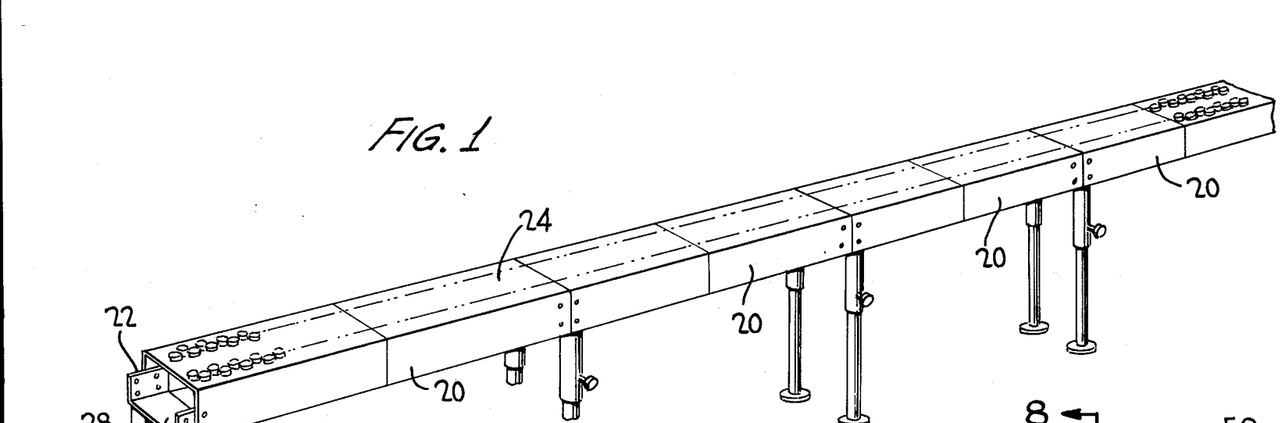
FIG. 1 is a perspective view of a plurality of modules of the conveyor operatively connected to provide a single conveyor installation, with the right hand end broken away and the left hand end shown unconnected to a next adjacent module of the installation.
Figure 2:
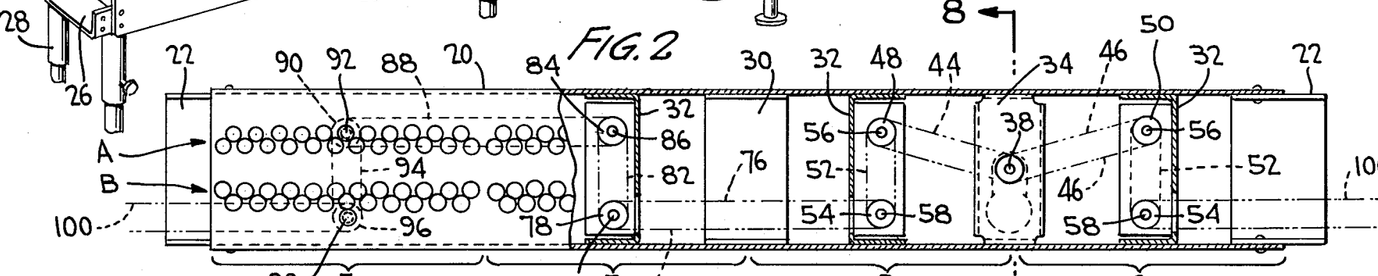
FIG. 2 is a relatively enlarged view, partly in top plan and partly in section on the line 2—2 of FIG. 3, of a single module.
Figure 3:
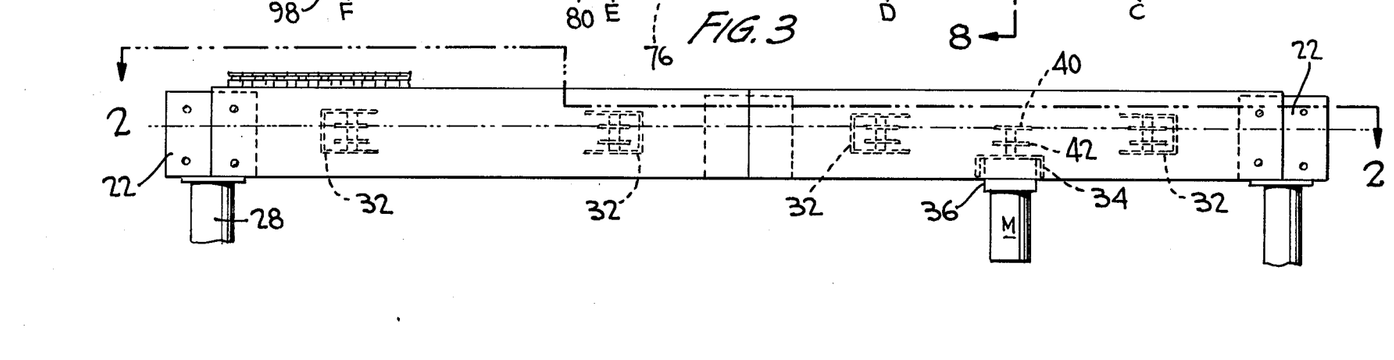
FIG. 3 is a side elevational view of the module of FIG. 2.

In the first preferred embodiment of the invention, shown in FIGS. 1-10, the reference numeral 20 designates a complete module, four of which appear in FIG. 1 coupled together in endwise relation to make up the conveyor, and one of which is shown on a relatively enlarged scale in FIG. 2. Each comprises an elongated inverted channel of sheet metal having interfitted at each end a longitudinally short upright channel section 22 having half of its length projecting beyond the end of the module web and side flanges for similar interfitting connection into an adjacent module so as to splice the two together in a conveyor assembly in which the web of the module channel constitutes the bed 24 of the conveyor and the web 26 of the splice channel 22 is mounted on a pair of laterally spaced legs 28, best made of telescoping sections for adjustment of the modules to accurately aligned horizontal level.

The channel elements are best made of sheet metal. In actual embodiments of the invention the modules have been made in six foot lengths. A central strengthening bracket 30 may if desired be used to mount additional legs, and spaced equidistantly along the bed 24 are four drive gear brackets 32. In a typical six foot module each endmost bracket 32 is nine inches from the adjacent end of the module bed, the brackets are 18 inches apart, and midway between the two brackets in one end portion of the module there is provided a motor mounting bracket 34. Mounted on the bracket 34 in depending relation is an assembly of electric motor M and reduction gear box 36 from which a main drive shaft 38 extends up through the bracket 34 in the longitudinal center line of the module. Upper and lower sprockets 40, 42, respectively, are fixed on the shaft 38, and sprocket chains 44, 46, respectively, are trained about the sprockets and extend in opposite directions along the module into engagement with sprockets 48, 50 (see FIG. 2), respectively, which are fixed on vertical shafts journaled respectively in the two next adjacent drive gear brackets 32.

The shafts mounting the sprockets 48, 50 are journaled in the respective brackets 32 beneath the same side margins of the conveyor bed. Each shaft has fixed on it, below its sprocket 48 or 50, a sprocket 49, which is connected by a cross chain 52 to the lower of two sprockets 54, 55 which are similarly mounted at the opposite end portion of the bracket 32, slightly closer to the adjacent edge of the bed, as will be noted in FIGS. 2 and 8.

The shafts on which the four sprockets 48, 50, 54, 54 are fixed extend up through the bed and may be considered to be the immediate drive shafts for the propelling rollers of the conveyor. The drive shafts of the sprockets 48, 50, which are less close to their side edge of the conveyor bed are designated 56, and the shafts of the sprockets 54, which are located along the other edge of the bed and more closely to that edge, are designated 58.

Fast on the upper ends of the drive shafts 56, 58, above the bed surface, are drive gears 60, 62, the purpose of which is to transmit propelling rotation to the conveyor rollers, which will now be described.

Figure 6:
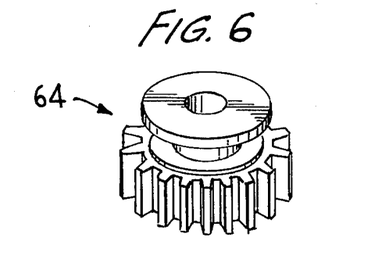
FIG. 6 is a perspective view of one of the propelling rollers.
Figure 7:
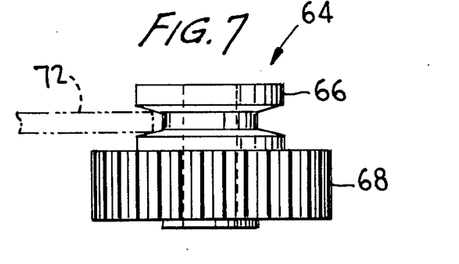
FIG. 7 is a side elevational view of the roller of FIG. 6.
Figure 8:
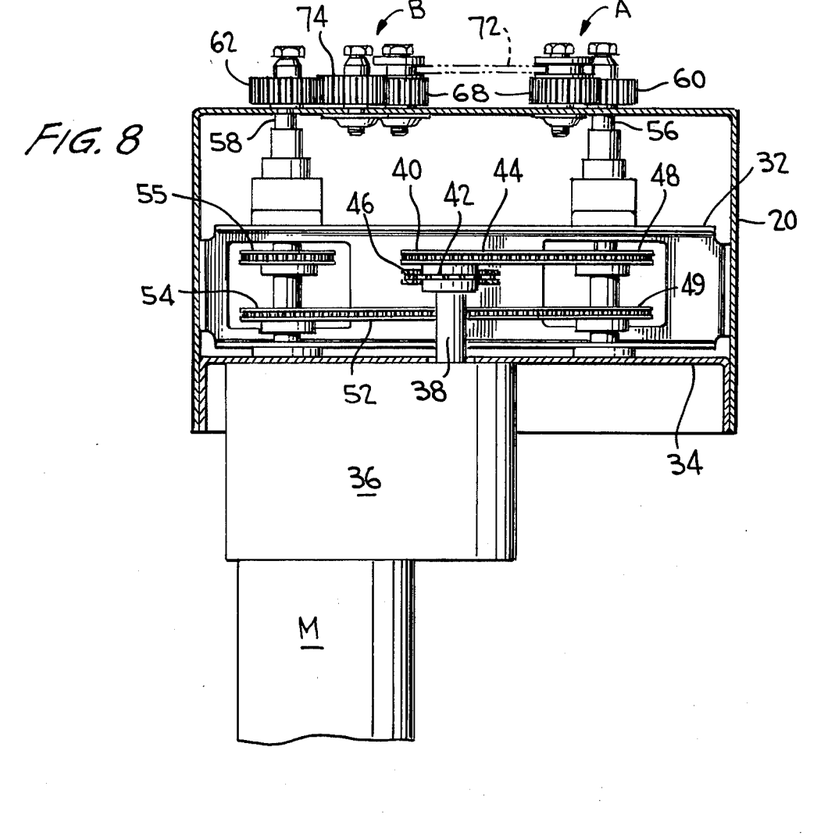
FIG. 8 is a vertical cross-sectional view taken on the line 8—8 of FIG. 2.

As shown in detail in FIGS. 6 and 7, each roller or roller element, designated 64 in its entirety, is best made as a unitary molded combination of coaxial upper roller component 66 and lower gear portion 68. The roller component is peripherally chamfered, in most cases by the groove of radially tapered cross section shown in FIG. 7, but in the case of other rollers, at particular locations or for special purposes hereinafter to be explained, the chamfer may be in the form of a topless groove, being substantially right-angular in radial section as shown at 70 in FIGS. 9 and 10.

Figure 4:
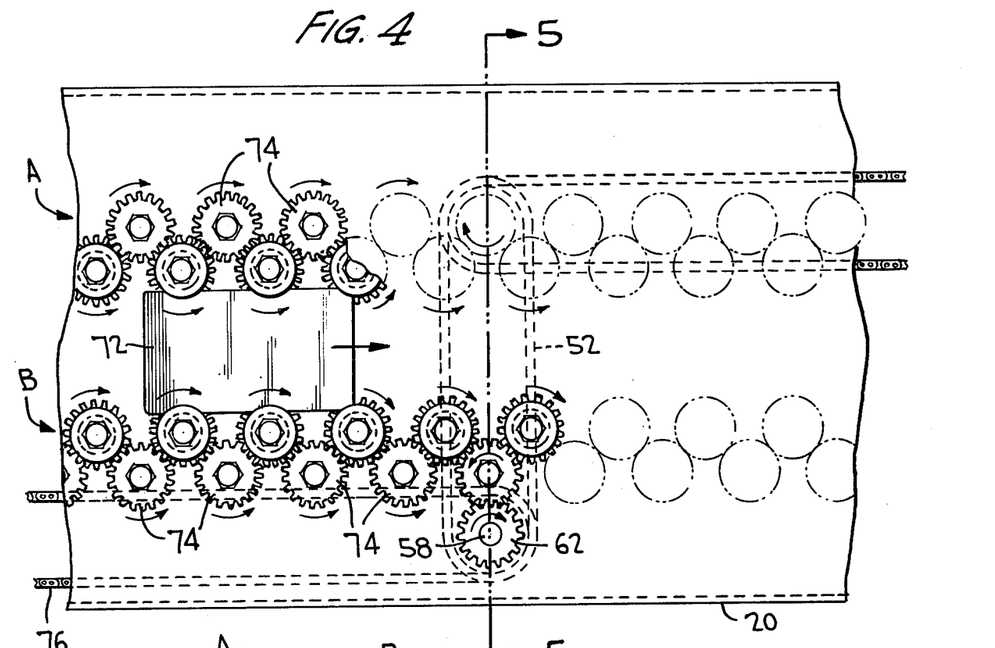
FIG. 4 is a detail top plan view of a portion of a module.

The rollers are mounted for free rotation on pins upstanding at uniform spacing along the bed of the conveyor in two laterally spaced lines designated A and B. As shown in FIGS. 2 and 4, each line is located the same distance from the adjacent longitudinal edge of the bed, and the spacing between the lines is selected with regard to the width of the card or other article to be conveyed. As shown in FIG. 7, the contour of the chamfer, i.e., its axial dimension, radial depth and radial slope of its sides, are selected with regard to the thickness of the card. The purpose is to have the rollers make substantially line contact only with the card edges, thereby obviating scratching and other marring of the cards, and to induce just enough frictional engagement with the cards to insure propulsion and yet permit slippage in the event card movement is blocked while roller rotation continues.

Figure 5:
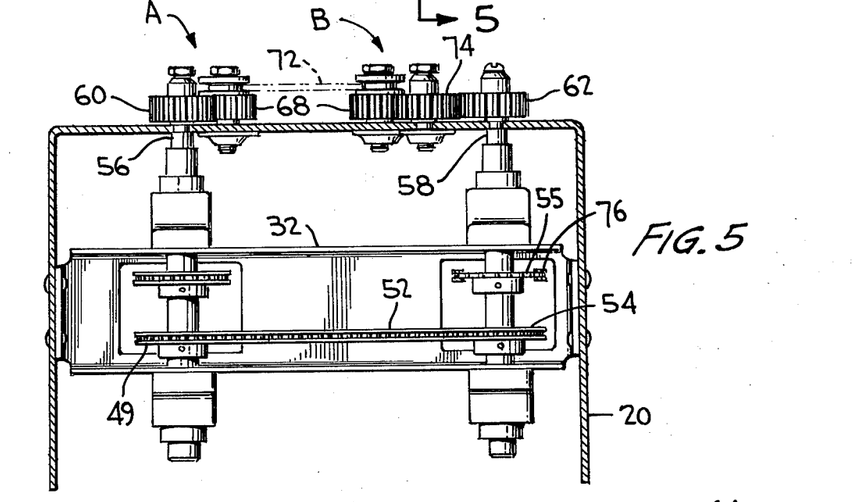
FIG. 5 is a vertical cross-sectional view taken on the line 5—5 of FIG. 4.

To turn the rollers of each line all at the same rate and in the same direction, the gear components 68 of adjacent rollers in the line are meshed with intervening idler gears 74. In order to turn the rollers of the two lines in opposite directions, the drive gears 60, 62 are meshed into the lines as shown in FIGS. 4 and 5, the gear 60 being engaged directly with two adjacent roller gears 68 of one line, designated A, and the gear 62 engaged with an idler gear 74 of the other line, designated B.

It will be noted that by the foregoing arrangement, as best illustrated by FIG. 2, the single motor M of the module drives all the rollers of the two lines A and B, with all the rollers of each line rotating in the same direction, and the rollers of the two lines rotating oppositely, as indicated by the arrows in FIG. 4, so that each card or other article 70 to be conveyed is moved along the bed. Moreover, as is clear from FIG. 2, while the rollers 64, and the equal number of gear components 68 thereof, in each line may be quite numerous, the driving torque transmitted through the gears 68 is applied to the gears of each line not by a single drive gear but is divided among several drive gears each driven directly by sprocket chain connection to the motor output shaft and each driving only an aliquot fraction of the total roller gears of the line.

Thus, in the illustrated example of the invention, the module shown in FIG. 2 is 72 inches long. The number of rollers is 48 in each line. The number of drive gears for each line is four, each driving 12 roller gears, six on each side, i.e., in each direction along the bed. This division is accomplished by omitting each twelfth idler gear along the bed, thus interrupting the drive being transmitted by the idler gears, and locating the brackets 32 at four equally spaced locations along the bed, each midway of a group of twelve rollers. Thus each of the four drive gears mounted on the two brackets 32 next adjacent to the motor bracket 34 directly drives only the six rollers anterior and posterior to it along the bed.

As will be seen in FIG. 2, the drive gear 60 (FIG. 5) on the shaft 56 shown at the extreme right in the figure drives only the twelve roller gears 68 in line A between the righthand end of the module and the transverse vertical plane of the motor output shaft, i.e., through that portion of the module length indicated by the brace C; and the drive gear 60 on the next adjacent shaft 56 to the left drives only the twelve roller gears in line A between that plane and the middle transverse plane of the module, i.e., those within the brace D. Similarly, each of the two drive gears 62 on the two shafts 58 in that same righthand half of the module drives six roller gears on each side of it, within braces C and D, respectively, of line B, for a total of twelve roller gears for each drive gear, or 24 for the portion of the line in the righthand half of the module.

Drive is transmitted to the roller gears of both lines in the lefthand half of the module by a longitudinal sprocket chain 76 which connects the upper sprocket 55 of the drive shaft 58 in brace D with the similar sprocket 78 fixed on a drive shaft 80 journaled in the next adjacent bracket 32 in the center of brace E, as shown in FIG. 2. A cross chain 82 connects the sprocket 78 with a sprocket 84 fixed on a drive shaft 86 jounaled in the bracket and mounting on its upper end a drive gear in line A. The roller gears of the brace E are driven by the gears 78 and 84 in the lines B and A, respectively. A longitudinal chain 88 in line A connects gear 84 with a gear 90 on shaft 92, and a cross chain 94 connects that shaft 92 with a gear 96 on a drive shaft 98 in line B. Thus the shafts 92 and 98 drive the roller gears of the lines A and B, respectively, in brace F.

It will be observed from the foregoing exemplary disclosure of a particular, preferred embodiment of the invention, that the arrangement may comprise a symmetrical disposition of driving and driven gears by which power is supplied by a single motor to an entire module, or to a plurality of endwise spliced identical modules, in a unitary installation in which each module mounts a very considerable number of individual article-engaging rollers, e.g., 96 in the selected example, divided into two transversely spaced lines of 48 each, with adjacent rollers in each line geared together for torque transmission limited to no more than six rollers comprised in a single train and with each of the 16 trains driven by its own single gear directly connected to the motor output. The conveyor operates with minimum driving load on the roller gears, thus insuring no objectionable build-up of such load as would result from any unduly long train involving a great number of roller gears. This is deemed to be an important feature of the invention.

As shown in FIG. 2, endwise spliced modules are operatively connected by sprocket chains 100. These serve the dual purpose of transmitting drive from a single motor in a system of plural modules and of coordinating all the rollers of the modules to a uniform rate of rotation.

The roller 64 has been described as a unitary molded combination of gear 68 and roller portion 66, with a chamfer 72 in the latter for making light gripping engagement with the margins of a card or the equivalent 72 as shown in FIG. 5 capable of slipping in the case of stoppoge of freedom of movement of the articles being conveyed, thus obviating "shingling" of the articles. The "chamfer" contemplated and prescribed in the appended claims is in most cases the groove shown in FIG. 7, with a 5° tapered slope; it may also be the topless form of right-angular radial section shown in FIG. 9 for use at selected locations where it may be desirable to permit ready lifting, manually or otherwise, of articles from the bed. In either case the roller combinations are conveniently made molded from plastic, such as the "Delrin" of E. I. DuPont de Nemours & Co., of Wilmington, Del.

Figure 11:
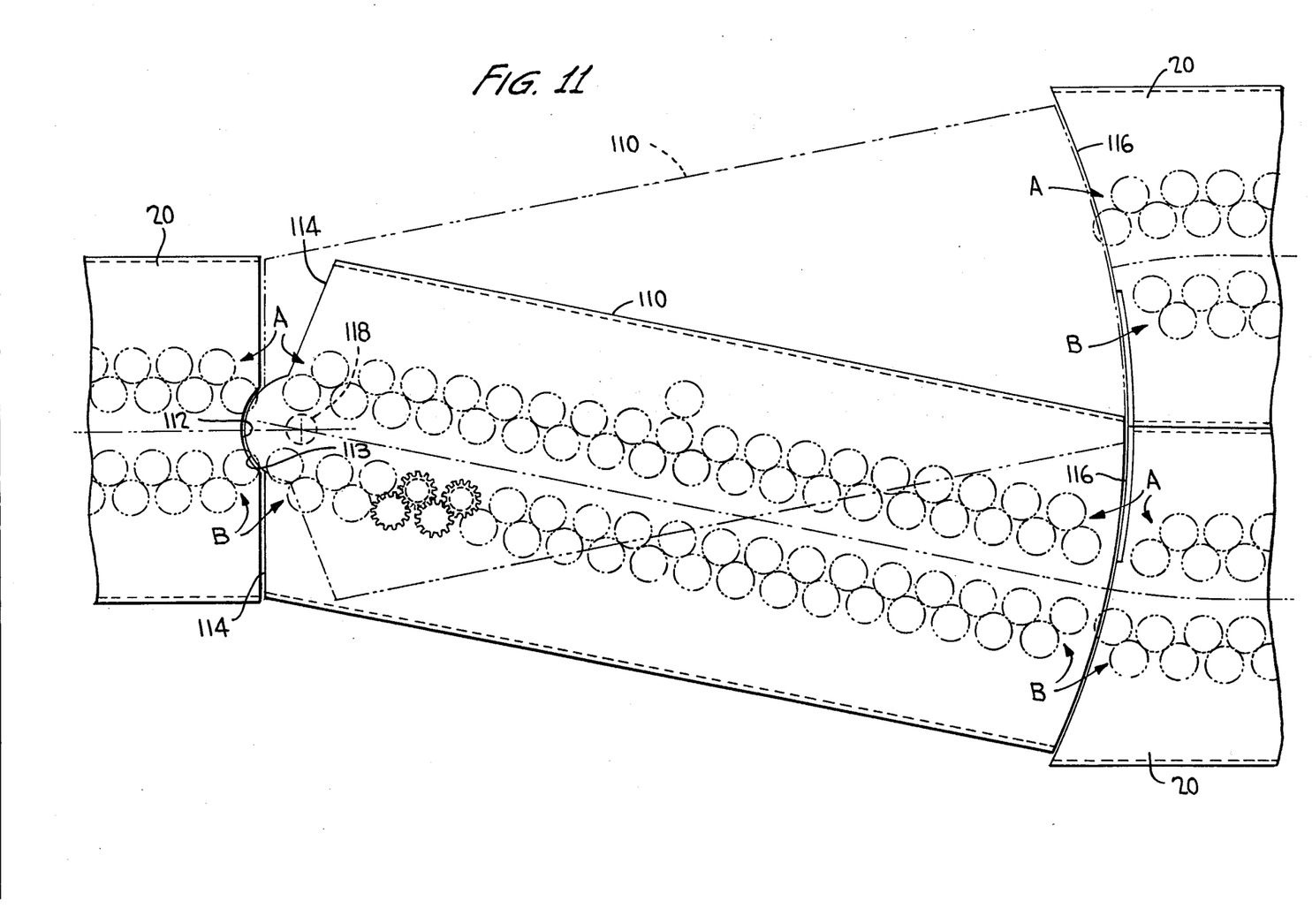
FIG. 11 is a top plan view of the discharge end portion of a conveyor module supplying alternatively two receiving modules connected selectively by a diverter module.

The sprocket chains 100 (FIG. 2) are functional not only to make driving connection between similar modules 20 spliced together in endwise series relation as shown in FIG. 1, but also to make operative connection between such modules and the diverter module shown at 110 in FIG. 11. This arrangement is useful in cases where the stream of articles moving along the conveyor is required to be divided into one or the other of two different paths selectively from time to time. For this purpose there is provided, at the discharge end of the endmost member 20 of a modular series, a diverter member 110 which receives articles from the module and is pivoted for lateral swinging movement selectively into communication with either of two receiving member modules 20. The connection of the diverter member into the system is conveniently effected by the construction shown in FIG. 11. This consists of complementally concavely surving the central portion 112 of the end edge of the discharging module, shown at the left in FIG. 11, and convexly curving the proximate central portion 113 of the bed of the diverter, mitering the remainder of the diverter bed end as shown at 114 so as to provide a continuous bed plane when the diverter is in either of its two adjusted positions, and complementally curving the abutting end edges of the beds of the diverter and the two receiving modules as shown at 116 for the same purpose of continuity of bed plane, all as shown in FIG. 11. The diverter is swingable laterally about a pivot pin 118 upstanding from a splice 22 on the adjacent supporting leg 28 (not shown).

As appears in FIG. 11, when the diverter is in the position there shown, the adjacent end rollers of the diverter and the two modules it connects in that position are at substantially the same spacing in one of the two lines, e.g., the line B, as the spacing of rollers throughout the line in the modules. It will be evident also that, when the diverter is swung to its other position, for delivery to the module 20 at the top of the figure, adjacent end rollers of the diverter and the modules will be similarly closely spaced in line A. It has been found in actual practice that the roller gripping achieved in this single line at the junction of diverter and modules 20 is quite adequate, even though the spacing of rollers in the other line is necessarily greater at the junction point.

Movement of the diverter may be manually by an operator or automatically by means forming no part of the present invention. It may be for any of a number of purposes, e.g., to abstract defective or otherwise particularized articles, or to deliver a number of articles of a particular count in separate groupings, or for other reasons, as will be understood.

Figure 9:
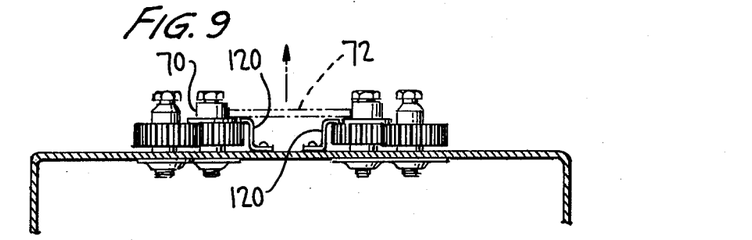
FIG. 9 is a vertical cross-sectional view showing a modified form of propelling roller.
Figure 10:
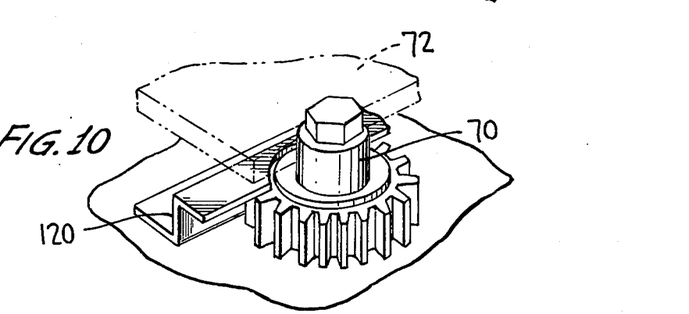
FIG. 10 is a detail perspective view of the roller shown in FIG. 9.

In some cases it may be found desirable to install guard means over the exposed gears of the first described species of the invention, in which these gears are arranged along the top of the conveyor bed. Such devices are shown in FIGS. 9 and 10 and may consist of simple plastic strips 120 of Z-shape in cross-section having bottom flanges secured to the bed and top flanges overlying the gear teeth, preferably indented to provide maximum coverage, as shown.

Figure 12:
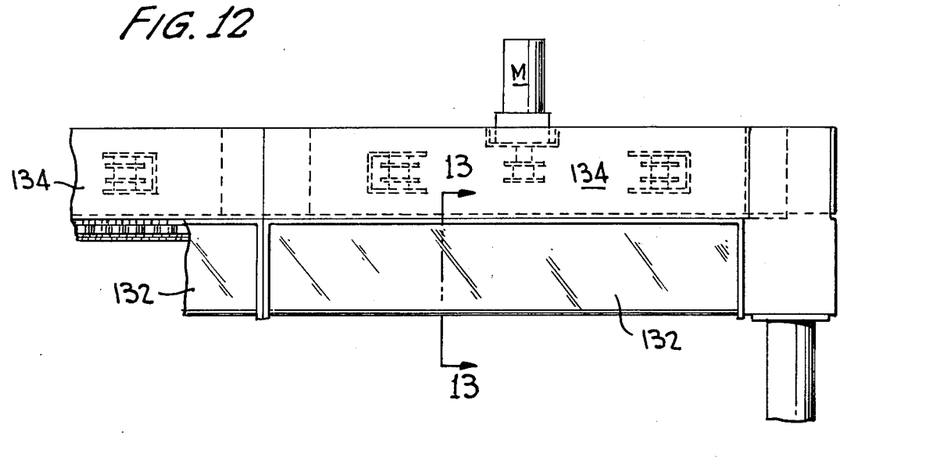
FIG. 12 is a detail side elevational view of a modified form of module.
Figure 13:
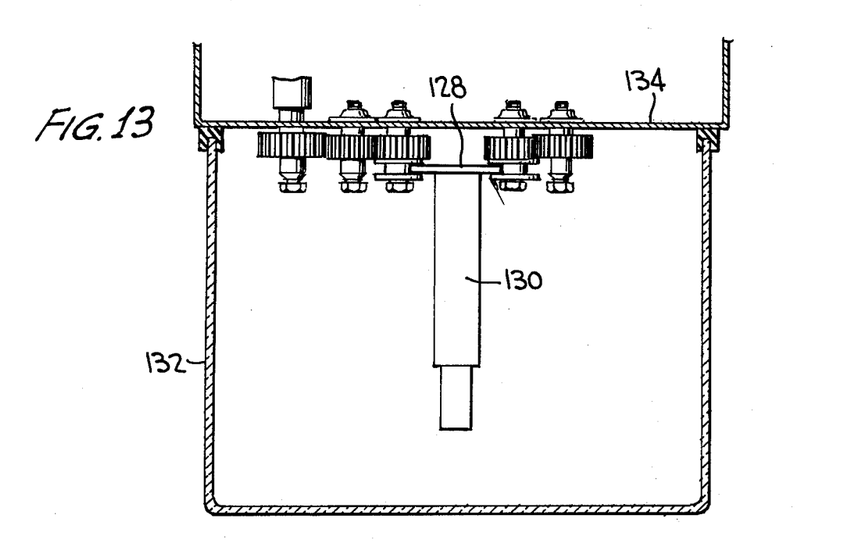
FIG. 13 is a vertical cross-sectional view taken on the line 13—13 of FIG. 12.

FIGS. 12 and 13 illustrate a modification of the species of the invention shown in the preceding figures in which the article-engaging rollers and their associated gears are mounted on the underside of the module bed rather than on the top surface. In this embodiment the motor M and its gear box are located on the top of the bed, as shown, and the connections from the gear box output to the gears are the same as those heretofore described, as are the details of the several rollers, gears, etc. This form of the invention is specially useful in conveying articles comprising what may be regarded as a card base 128 surmounted by a body of some considerable height, like the "cartridge" 130 in FIG. 13. Such cartridges are made for medical and other laboratory use and require conveying in manufacture, sterilization, filling, capping, etc. Some of this conveying is best made with the cartridge inverted, as shown in FIG. 13, where a cartridge is seen hanging from its card or card-like base 128 while being conveyed through an enclosure 132 beneath the conveyor bed 134.

Figure 14:
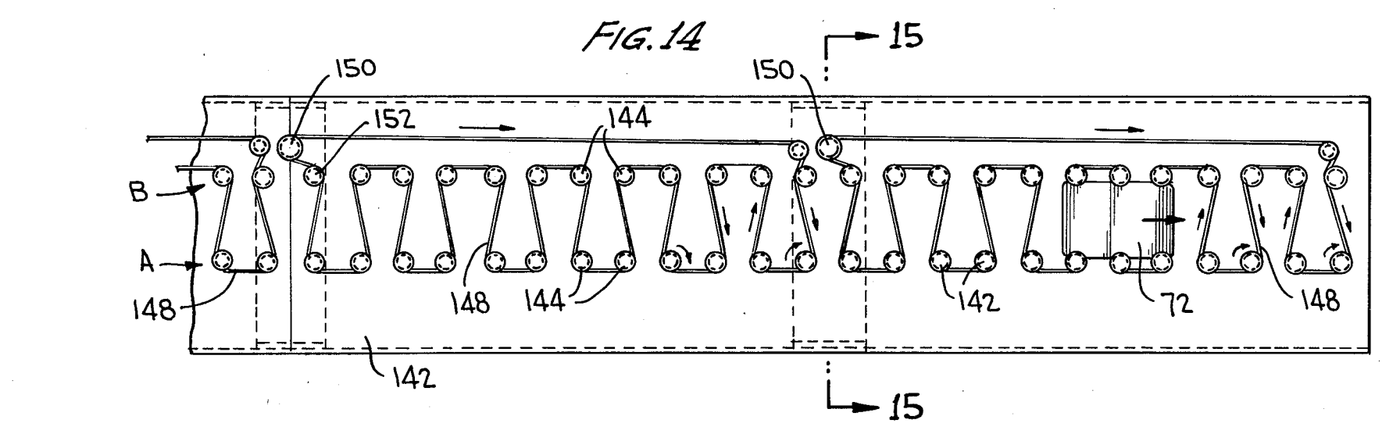
FIG. 14 is a top plan view of a further modified type of module.
Figure 15:
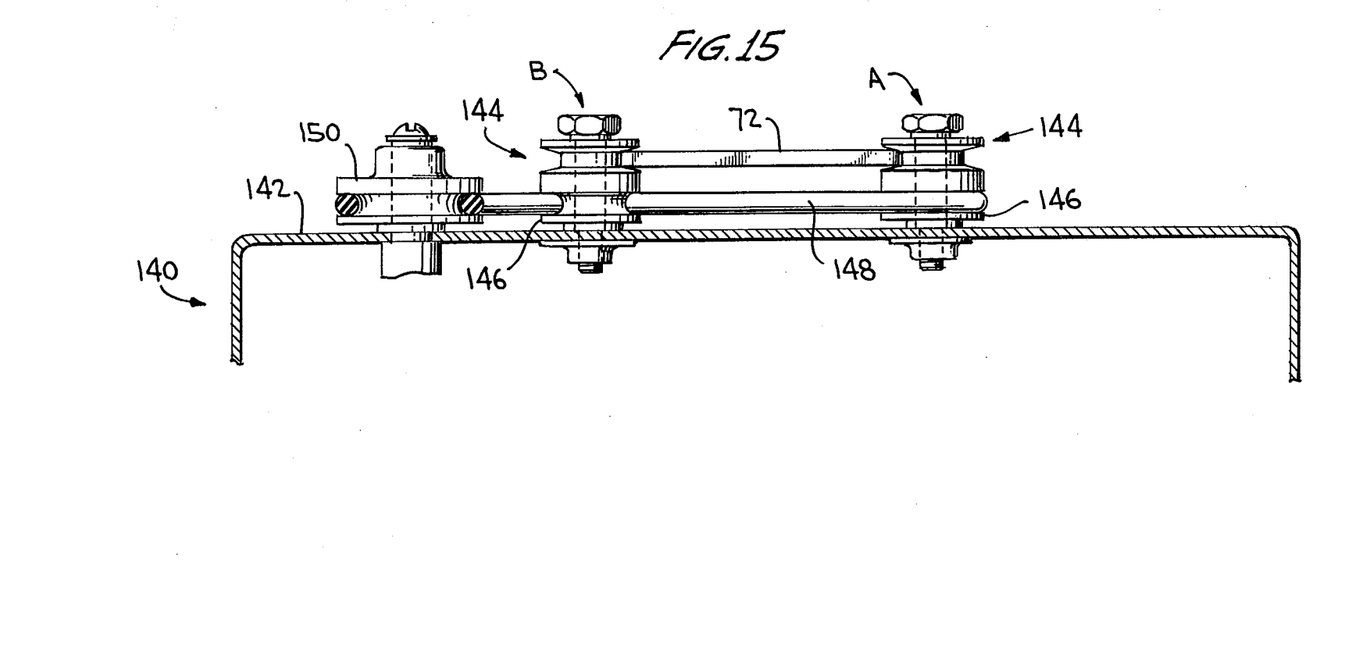
FIG. 15 is a vertical cross-sectional view taken on the line 15—15 of FIG. 14.

FIGS. 14 and 15 show a further modification in which the modules 140 are made with top surface beds 142 on which are journaled two lines A and B of card-gripping rollers 144 which are rotated in opposite directions by motor and drive shafts all arranged as in FIGS. 1–10. Also as shown in those figures, the rollers are provided in the number of 48 in each line, divided into four groups of twelve rollers each, with a direct drive from the motor to the center of each group, so that each drive gear drives six rollers anterior to it and six rollers posterior to it along the bed. The modification differs in the specific roller form and in the mode of inter-connection of the rollers. Instead of having gear portions beneath their chamfered upper portions, the roller elements 144 have pulley portions 146. A single endless belt 148 is trained about all 24 such pulley portions of each group, being driven by a single drive pulley 150, then engaging the first pulley 152 of the adjacent line, then crossing the bed between the lines, and being convoluted about the roller pulleys of the two lines in such manner that all the rollers in each line are rotated in the same direction and the rollers of opposite lines are rotated in opposite directions.

Further details of the modified module 142 and of an installation of them in a plural module conveyor system are as shown and described in connection with FIGS. 1–10.

As will be recognized from the foregoing explanation of the invention, certain of the broad principles of the underlying concept are capable of being embodied in various forms utilizing mechanical equivalents or specifically different means for accomplishing identical or functionally similar purposes in the inventive combination. This is to be kept in mind in construing the appended claims, and particularly in assessing the scope of certain terms used in the claims to define the invention.

Thus, for example, the transmission of torque to the rollers, (or to the card-engaging portions of the roller elements) is defined in the claims as drive-receiving portions of the rollers, a term intended to be generic to the meshed gear embodiment of FIGS. 1–10 and the belt and pulley embodiment of FIGS. 14–15.

Again, the chamber may be a true groove as in FIGS. 7 and 15, a radial step as in FIGS. 9 and 10, or any other roller periphery indentation capable of performing the required function of making propelling engagement with the cards.

Also, within the comprehension of the term cards there must be included any object or article presenting the conveying problem of true card shape and dimensions, the invention being of course in the means for conveying rather than in the article being conveyed.

Again, the drive gearing recited in the claims need not comprise toothed gears, sprockets and chains, but must be understood to include also belt and pulley transmission.

While certain modifications and alternatives have been disclosed in the embodiments hereinabove selected to exemplify the invention, others are contemplated within the broad principles of the invention as defined by the appended claims and are to be deemed within the scope and purview thereof.

I claim:

1. A conveyor for moving a plurality of articles including cards successively in flat horizontal position comprising
    a plurality of supporting structures each comprising an inverted channel the web of which provides a longitudinally elongated bed,
    a plurality of rollers mounted in each supporting structure along said bed for rotation on vertical axes in two longitudinally extending lines laterally spaced apart,
    each roller having a peripherally chamfered end portion and an axially spaced drive-receiving portion,
    power means including an electric motor carried by each supporting structure connected to the drive-receiving portions of the rollers for rotating the rollers of the two lines in opposite directions,
    whereby each supporting structure and its supported elements comprise a complete conveyor module,
    means splicing the modules endwise to each other to form a continuous conveyor,
    gearing traversing said splicing means connecting the rollers of contiguous modules to each other for insuring uniform rotation of all the rollers of the conveyor,
    said splicing means comprising a short upright channel having its upturned flanges bolted to the downturned flanges of adjacent supporting structure channels, and
    legs having their tops bearing the webs of the splicing means channels, thereby supporting the entire conveyor,
    whereby rotation of the rollers causes cards having their longitudinal edge margins seated in the chamfers of the rollers to be propelled along the bed.

2. A conveyor for moving a plurality of articles including cards successively in flat horizontal position comprising
    a supporting structure providing a longitudinally elongated bed,
    a plurality of rollers mounted in said supporting structure along said bed for rotation on vertical axes in two longitudinally extending lines laterally spaced apart,
    each roller having a peripherally chamfered end portion and an axially spaced drive-receiving gear,
    a plurality of idler pinions pintled in the supporting structure adjacent to each of said longitudinal lines,
    each idler pinion being meshed with two adjacent gears in the line,
    power means comprising an electric motor having a drive shaft carried by the supporting structure,
    first drive gearing connecting said motor drive shaft with a roller gear in one of said lines for rotation in one direction, and
    second drive gearing connecting said motor drive shaft with a roller gear in the other of said lines for rotation in the opposite direction,
    whereby rotation of the rollers causes cards having their longitudinal edge margins seated in the chamfers of the rollers to be propelled along the bed.

3. A conveyor as claimed in claim 2 in which
    said first drive gearing includes a drive gear driven in the direction of the motor drive shaft and meshed with a driven roller in the first named line, and
    said second drive gearing includes an idler gear driven in the direction of the motor drive shaft and meshed with a driven roller in the second named line for rotation in the opposite direction.

4. A conveyor for moving a plurality of articles including cards successively in flat horizontal position comprising
    a supporting structure providing a longitudinally elongated bed,
    a plurality of rollers mounted in said supporting structure along said bed for rotation on vertical axes in two longitudinally extending lines laterally spaced apart, each roller having a peripherally chamfered end portion and an axially spaced drive-receiving pulley, an endless belt trained over the sides of the pulleys in both lines to rotate the pulleys of the lines in opposite directions, power means comprising an electric motor having a drive shaft carried by the supporting structure, and transmission means connecting the motor to said pulleys, whereby rotation of the rollers causes cards having their longitudinal edge margins seated in the chamfers of the rollers to be propelled along the bed.

the drive-receiving rollers of an aliquot number of the rollers in each line being connected together to form a single train of rollers to rotate in the same direction, an electric motor carried by the supporting structure, and transmission means connecting the motor to said trains for rotating the rollers of the two lines in opposite directions to move said cards along the bed, said transmission means comprising a direct drive from said motor output to the center of each train for driving an equal number of rollers in each direction along the bed.

5. A conveyor for moving a plurality of cards successively in flat horizontal position comprising a supporting structure providing a longitudinally elongated bed, a plurality of rollers mounted in said supporting structure along said bed for rotation on vertical axes in two longitudinally extending lines laterally spaced apart, said rollers having upper end portions adapted to engage the side edges of cards to be moved along the bed, and having drive-receiving lower end portions, 6. A conveyor as claimed in claim 5 in which the drive-receiving portions of the rollers are gears and the connection of the rollers in each train is by meshing of the gears thereof, and the transmission means direct drive from the motor output is a sprocket chain.

7. A conveyor as claimed in claim 5 in which the drive-receiving portions of the rollers are pulleys and the connection of the rollers in each train is an endless belt trained over the pulleys thereof, and the transmission means direct drive from the motor output is an endless belt.

8. A conveyor system for moving a plurality of cards successively in flat horizontal position comprising a plurality of modules, each module comprising the structure claimed in claim 5, coupling means connecting said modules together in end to end longitudinal alignment, and drive-transmitting means bridging said coupling means and transmitting drive directly between said named transmission means of adjacent modules, whereby all the rollers of the plurality of modules are rotated at the same rate.

* * * * *